United States Patent [19]

Economy

[11] 4,156,318
[45] * May 29, 1979

[54] ATTACHMENT FOR SHOPPING CART

[76] Inventor: George C. Economy, 1807 Meadowdale Ave., NE., Atlanta, Ga. 30306

[*] Notice: The portion of the term of this patent subsequent to Jul. 12, 1994, has been disclaimed.

[21] Appl. No.: 786,648

[22] Filed: Apr. 11, 1977

Related U.S. Application Data

[63] Continuation-in-part of Ser. No. 634,768, Nov. 24, 1975, Pat. No. 4,034,539.

[51] Int. Cl.² .............................................. G09F 21/00
[52] U.S. Cl. .............................. 40/308; 280/33.99 A; 281/45
[58] Field of Search ................. 40/308, 10 R, 320; 280/33.99 A, 33.99 B, 33.99 C, 33.99 T, 33.99 R, 33.99 S, 33.99 H, 33.99 F; 281/45, 15 B, 30

[56] References Cited

U.S. PATENT DOCUMENTS

| Re. 24,297 | 4/1957 | Brockway | 40/308 |
|---|---|---|---|
| 2,527,216 | 10/1950 | Harris | 281/44 |
| 2,888,761 | 6/1959 | Miller | 40/10 |
| 2,890,059 | 6/1959 | Brooks et al. | 280/33.99 A |
| 2,891,801 | 6/1959 | Sides | 280/33.99 |
| 2,998,978 | 9/1961 | Sides | 280/33.99 |
| 3,023,018 | 2/1962 | Welter | 280/33.99 |
| 3,057,635 | 10/1962 | Ciborowski | 280/33.99 |
| 3,082,557 | 3/1953 | Huff | 40/10 |
| 3,129,015 | 4/1964 | Lachance | 280/33.99 |
| 3,168,327 | 2/1965 | Lachance | 280/33.99 |
| 3,251,543 | 5/1966 | Bush et al. | 235/1 |
| 3,351,380 | 11/1967 | Sprague | 297/377 |
| 3,539,204 | 10/1970 | Keller | 40/308 |
| 3,881,267 | 5/1975 | Hicks | 40/306 |
| 3,993,319 | 11/1976 | Day | 280/33.99 A |
| 4,034,539 | 6/1977 | Economy | 40/308 |

FOREIGN PATENT DOCUMENTS

| 1553969 | 1/1969 | France | 280/33.99 A |

*Primary Examiner*—John F. Pitrelli
*Assistant Examiner*—G. Lee Skillington
*Attorney, Agent, or Firm*—Jones, Thomas & Askew

[57] ABSTRACT

An attachment, providing a substantially flat and stable writing surface for the shopper, for use on a supermarket shopping cart of the type having a collapsible infant seat pivotally connected to its rear wall. The attachment is pivotally connected to the upper transverse bar of either the rear wall of the shopping cart or the upper transverse bar of the inner wall which forms a part of the infant seat. When in use, the attachment extends forwardly over the infant seat space and rests on the upper transverse bars of the inner wall of the infant seat and of the rear wall of the cart. When the attachment is not in use and the infant seat is closed, the attachment pivots about one of the upper transverse bars of the cart and hangs in a downward attitude. The attachment is constructed as an integral unit of synthetic material and has a flat upper surface which optionally includes advertizing material for products sold in the store and indications where products are located in the shopping area. The attachment also is optionally provided with means for releasably holding a shopper's list and means for holding a pencil.

4 Claims, 6 Drawing Figures

U.S. Patent   May 29, 1979   Sheet 1 of 2   4,156,318
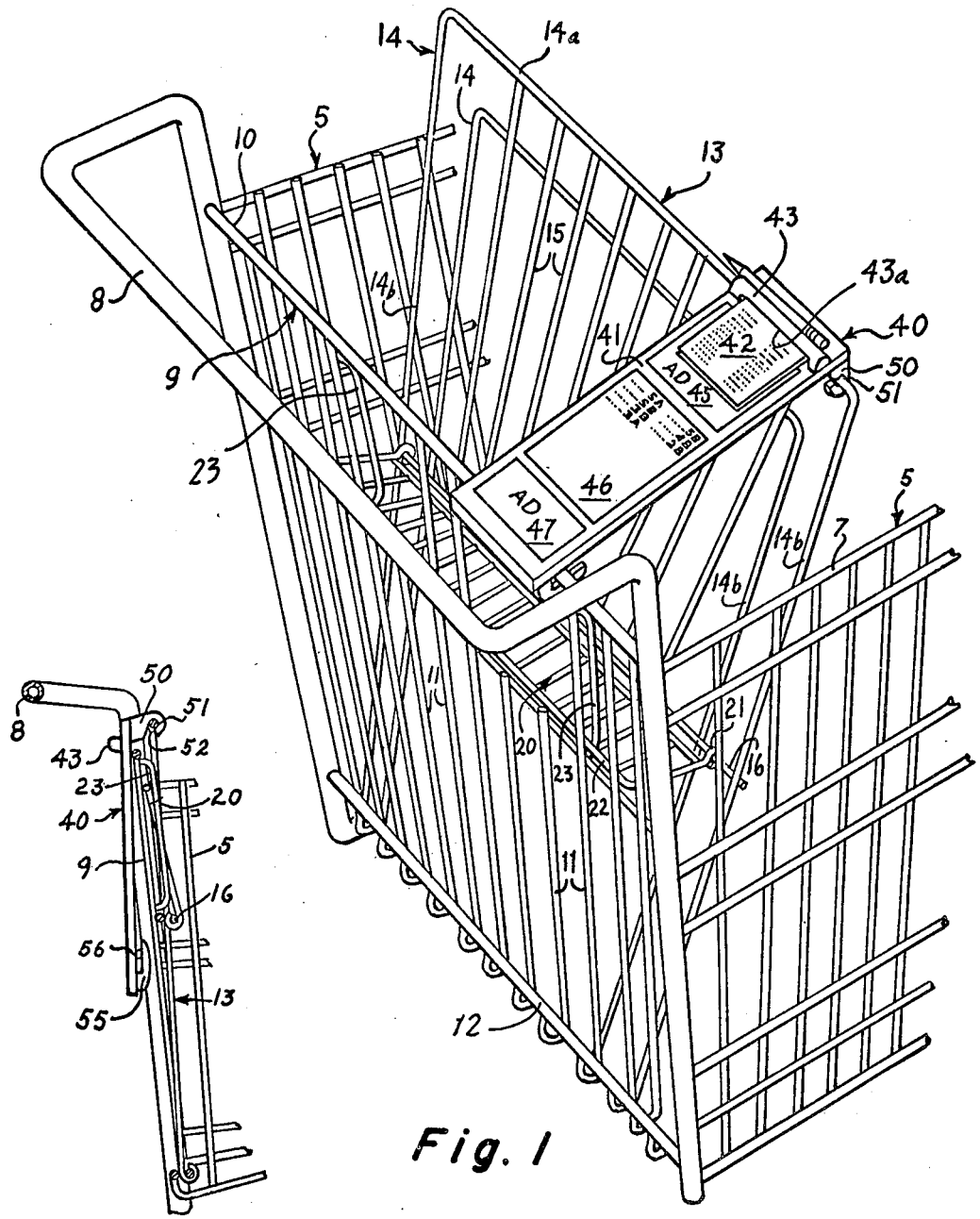
Fig. 1
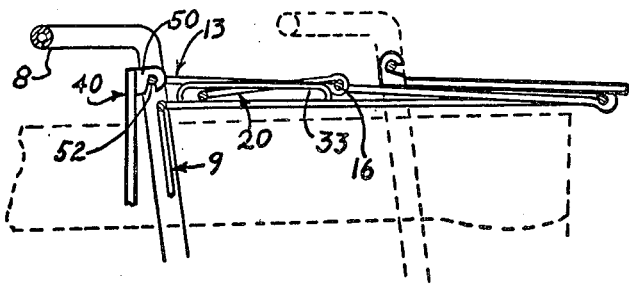
Fig. 2
Fig. 3

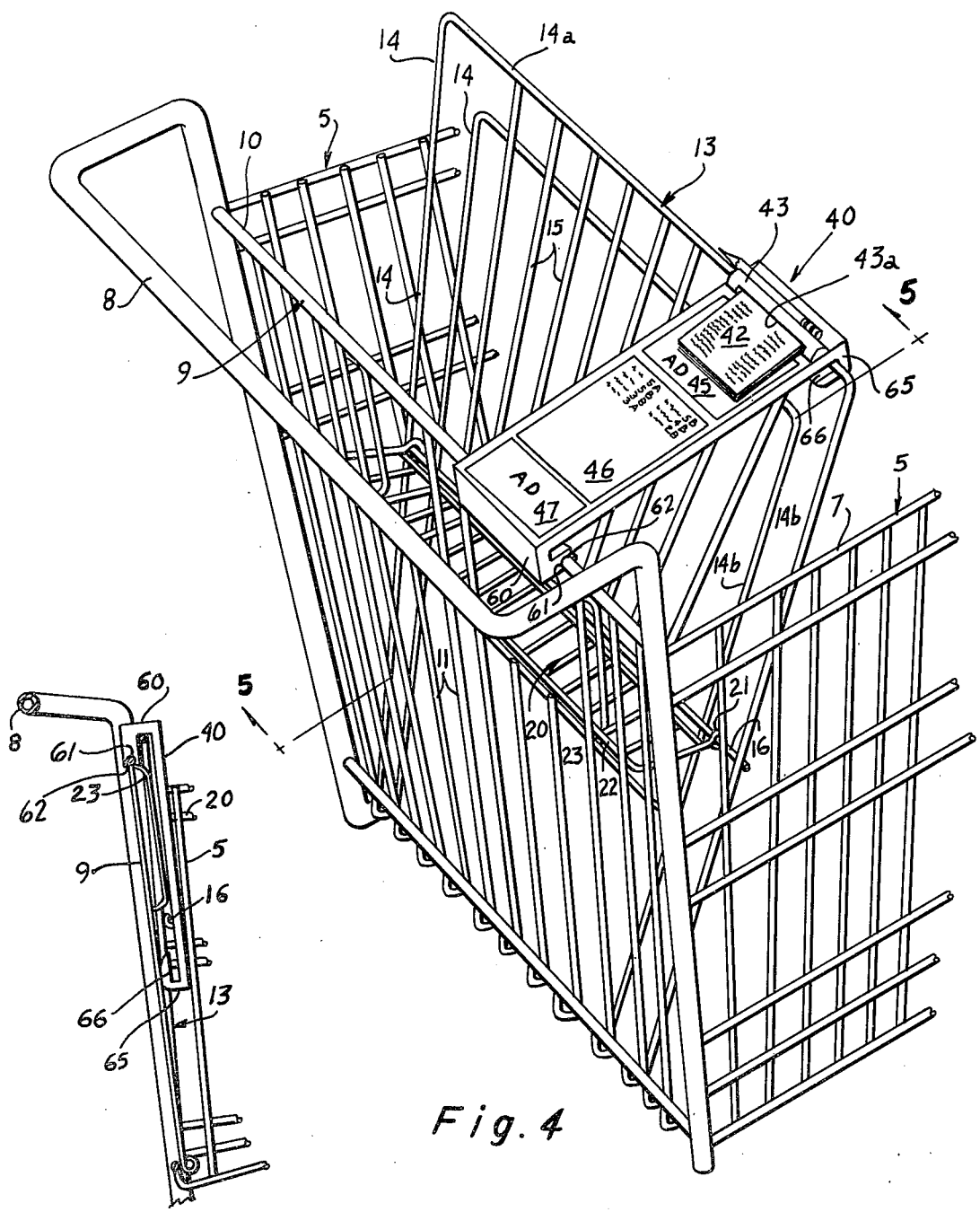
Fig. 4
Fig. 5
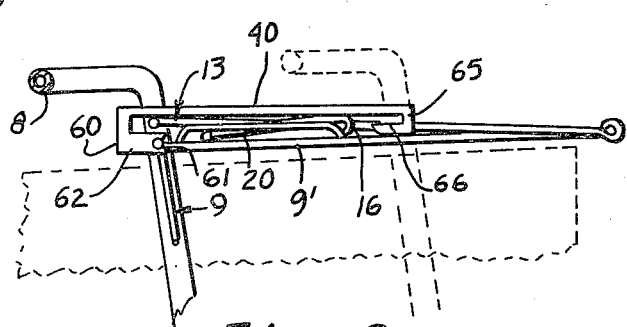
Fig. 6

ATTACHMENT FOR SHOPPING CART

CROSS-REFERENCE TO RELATED APPLICATION

This is a continuation-in-part of application Ser. No. 634,768, filed Nov. 24, 1975, now U.S. Pat. No. 4,034,539.

BACKGROUND OF THE INVENTION

This invention relates to a shopping cart attachment and is more particularly concerned with an attachment for use on a shopping cart which will provide a substantially flat and stable writing surface for the shopper and provide means for advertising and identifying the location of items included in the shopping area.

Most modern supermarkets include shopping carts which the shopper can obtain and maneuver over the shopping area for carrying goods to be purchased. One of the problems in utilizing a shopping cart is that the shopper may have a list of items to be purchased and it is often desirable to mark these items off as they are located. Without the aid of an attachment to the cart providing a substantially flat and stable writing surface, it is difficult to mark these items off the list. Further, in using a shopping list and shopping cart, it is usually cumbersome for the shopper to hold a list and a writing instrument while the shopper retrieves and places the items to be purchased in the cart.

Another problem with using a shopping cart and attempting to locate items in the shopping area, is finding the items desired for purchase. Many of the supermarkets include signs located above particular shopping aisles which identify a few of the items located in that particular aisle. However, these shopper guides do not include many of the items located in the shopping area and the signs are difficult to read by a near-sighted shopper. Further, it is difficult to see all of the signs from any particular point in the store and it is sometimes necessary to traverse a number of aisles to read all the signs before locating the item desired.

The prior art includes U.S. Pat. Nos. 2,888,761, 3,251,543, and 3,539,204, which show various attachments for shopping carts that provide a writing platform. Some of these attachments also provide areas for advertisements of products in the store or a directory to indicate where the products can be found in the store. One type of attachment disclosed in the prior art is an attachment only attached to the transverse handle of the cart. As such, those attachments appear to be merely clamped to the handle and therefore may have had a tendency to be unstable.

The prior art also discloses supporting the attachment by legs at the four corners of the attachment or supporting the platform beneath both the top and bottom edges of the platform. While these attachments appear to be more stable, it also appears that they may have hindered the nesting of the carts. Additionally, they do not appear to be useful on carts having collapsible infant seats.

SUMMARY OF THE INVENTION

The shopping cart attachment of the present invention solves many of the problems described above by providing a collapsible writing platform for use on a cart equipped with an infant's seat which, when the infant seat is opened, provides a stable writing platform supported between the upper transverse bar of the rear wall of the shopping cart the upper transverse bar of the inner wall of the open infant seat. When the infant seat is collapsed, the writing platform is pivotally suspended by either the upper transverse bar of the rear wall of the shopping cart or the upper transverse bar of the inner wall of the infant seat and hangs freely adjacent either the inner wall of the collapsed infant seat or the rear wall of the cart. The platform can be formed with advertisements of products offered for sale in the store so that the shopper is likely to be continually reminded to purchase the advertised products while shopping.

It is therefore an object of the present invention to provide a platform for releasably holding a shopping list and a writing instrument and for providing a stable writing surface.

It is another object of the present invention to provide an attachment having a writing surface which will not require frequent adjustment and maintenance to maintain the desired position of the writing surface.

It is a further object of this invention to provide a collapsible attachment having a writing surface.

Still another object of the present invention is to provide an attachment which, when collapsed, will permit the shopping carts to be nested.

A still further object of the present invention is to provide an attachment for use on a shopping cart which will permit display of advertising material and will include means for identifying the location of products to be selected.

An additional object of the present invention is to provide an attachment for use on a shopping cart which is simple in construction and use, economical to manufacture and reliable in performance.

These and other objects and advantages of the present invention will become apparent after reading the following description of the illustrative embodiment, with reference to the attached drawings.

BRIEF DESCRIPTION OF THE DRAWINGS

FIG. 1 is a fragmentary perspective view of a shopping cart showing a first illustrative attachment embodying the principles of the present invention supported in an operable position.

FIG. 2 is a vertical section view taken longitudinally through the shopping cart showing the first illustrative attachment support in a nonuse position.

FIG. 3 is a fragmentary side elevational view of a shopping cart with the rear wall panel of the shopping cart adjusted to a horizontally oriented position for nesting additional shopping carts, with the additional shopping carts shown in phantom lines.

FIG. 4 is a fragmentary perspective view of a shopping cart showing a second illustrative attachment embodying the principles of the present invention supported in operable position.

FIG. 5 is a vertical sectional view taken longitudinally through the shopping cart showing the second illustrative attachment supported in a nonuse position.

FIG. 6 is a fragmentary side elevational view of a shopping cart having the second illustrative attachment and showing the rear wall panel of the shopping cart adjusted to a horizontally oriented position for nesting additional shopping carts, with the additional shopping carts being shown in phantom lines.

DESCRIPTION OF THE ILLUSTRATIVE EMBODIMENT

Referring now to the drawing, the attachment embodying the principles of the present invention is shown on a shopping cart generally represented by the reference numeral 5, with the attachment being generally represented by the reference numeral 40. The shopping cart is of conventional wire rod construction and includes side walls 6 and 7; a transverse handle 8; and a rear wall 9. The rear wall 9 includes an upper horizontal transverse bar 10 which is pivotally supported at its opposite ends in the side walls 6 and 7. The rear wall 9 includes a plurality of vertical rod elements 11 operatively connected between the upper transverse rod 10 and a lower horizontal transverse rod 12.

As shown in FIG. 1, the shopping cart includes a collapsible infant seat generally represented by the FIG. 20. The infant seat 20 includes an adjustable inner wall 13 which provides a back for the infant seat 20. The adjustable inner wall 13 includes a pair of inverted U-shaped rod elements 14, comprising an upper transverse bar 14a and depending legs 14b. The lower ends of the legs 14b are formed around the lower horizontal transverse bar 12 to define a pivotal connection therebetween. The adjustable inner wall 13 also includes a number of vertical rod members 15 which extend from upper transverse bar 14a to an intermediate horizontal transverse rod member 16. The infant seat 20 also includes a seat constructed of a number of fore and aft extending rod members with certain of the rod members, including end portion 21, formed around the intermediate transverse rod member 16 to provide a pivotal connection therebetween. The seat 20 also includes a transverse rod portion 22 which is slidably received within a plurality of guide slots 23 formed by the vertical rod members 11 on the rear wall of the cart 5. Inner wall 13 is movable between adjusted positions wherein the wall is either supported in contact with the rear wall 9 or in an angularly displaced forward position, as shown in FIG. 1. When the inner wall 13 is moved to the angularly displaced foreward position, the seat 20 is adjusted relative to the guide slots 23 to define a seating area on which an infant may sit during use of the shopping cart. The rear wall 9 of the cart 5 is also provided with conventional openings through which the infant's legs can be positioned during use of the infant seat 20.

As shown in FIGS. 1–3, the rear wall 9 is pivotally adjustable from a vertically oriented position as shown in FIGS. 1 and 2 to a horizontally oriented position, as shown in FIG. 3, whereby adjacent carts can be nested relative to each other when not in use. The pivotal support of upper transverse rod 10 permits the rear wall to be adjusted between the vertically and horizontally oriented positions described above. The above described shopping cart is of conventional construction and forms no part of the present invention. The details of the cart have been described so that an understanding can be obtained of the attachment embodying the principles of the present invention.

As shown in FIGS. 1–3, the attachment embodying the principles of the present invention is generally represented by the reference numeral 40. Attachment 40 is constructed of an integral piece of synthetic material and includes a substantially flat upper surface 41. The flat upper surface 41 defines a writing surface on which a shopper's list 42 can be placed. The shopper's list 42 is releasably secured on the upper surface 41 by means of a biasing clamp 43. The biasing clamp 43 is integrally formed with the attachment and is provided with a slotted area 43a in which the shopper's list is releasably gripped. The biasing clamp 43 also defines a shoulder portion behind which a writing instrument, such as a pencil or pen, can be placed during use of the shopping cart and attachment.

The upper surface of the attachment is divided into a plurality of outlined areas 45, 46 an 47. The outlined areas 45, 47 provide a surface on which advertising material can be displayed. Outlined area 46 will provide a surface on which an itemized directory to products in the supermarket can be displayed. The directory might include the items in the store listed alphabetically along with the location of the aisle on which the product is displayed.

As shown in FIGS. 1–3, the attachment 40 is provided with a plurality of integrally formed projections 50 projecting perpendicularly from the bottom surface of the attachment at its forward edge. The integrally formed projections 50 are provided with laterally aligned openings 51 and radially extending slots 52. The projections 50 are detailed for pivotally engaging the upper transverse bar 14a of the adjustable inner wall 13. In the placement of the attachment on the shopping cart, the upper transverse bar 14a is located adjacent radially extending slots 52 and the bar is forced through the slots into the open area 51. Slots 52 are detailed in dimension to be slightly less than the diameter of the upper transverse bar 14a so that the bar will not be inadvertently dislodged from the attachment member. Since projections 50 are constructed of synthetic material, the slots 52 will expand during displacement of the bar through the slot and then be returned to their normal position so that the attachment member can be pivotally supported by the upper transverse member 14a of the inner wall 13.

As shown in FIG. 2, when the inner wall 13 is supported in the collapsed nonuse position in contact with rear wall 9, the attachment member 40 will be supported in a substantially vertical position adjacent the outer surface of rear wall 9. When inner wall 13 is angularly displaced forward to open the infant seat, the attachment 40 will be pulled forward to the substantially horizontal orientation shown in FIG. 1. The bottom surface of the rear end of the attachment 40 will then rest on the upper transverse bar 10. As shown in FIGS. 1 and 2, the bottom of the attachment 40 is provided with a plurality of downwardly extending integrally formed projections 55 each of which define a forwardly open notched area 56. When the infant seat is opened, the bottom surface of the attachment 40 will slide over bar 10 until the bar 10 is engaged and positioned in the notches 56. Projections 55 with notches 56 will restrain the rear end of the attachment member from being angularly displaced when in the horizontal position. After the shopping cart has been used, the inner wall 13 can again be returned to the vertically displaced position causing the attachment 40 to move rearwardly so that the upper transverse bar 10 will be disengaged by the notches 56 thereby allowing the attachment 40 to again drop or be rotated by gravity to the vertically oriented position adjacent the outside of the rear wall 9.

As shown in FIGS. 4–6, the attachment 40 may alternatively be pivotally supported by the upper transverse bar 10a of the rear wall 9. In this second illustrative embodiment, the attachment 40 is provided with a plurality of integrally formed projections 60 projecting perpendicularly from the bottom surface of the attachment 40 at its rear edge. The integrally formed projections 60 are provided with laterally aligned openings 61 and radially extending slots 62. Projections 60 are detailed for pivotally engaging the upper transverse bar 10 of the rear wall 9. In the placement of the attachment 40 on the shopping cart, the upper transverse bar 10 is located adjacent radially extending slots 62 and the bar 10 is forced through the slots into the open area 61. Slots 62 are detailed in dimension to be slightly less than the diameter of the bar 10 so that the bar 10 will not be inadvertently dislodged from the attachment 40. Since the projections 60 are constructed of synthetic material, the slot 62 may be expanded during displacement of the bar through the slots and then returned to their normal position so that the attachment 40 can be pivotally supported by the upper transverse bar 10. Of course, the attachment may also be provided with hinges between the attachment 40 and the projections 60 to further facilitate the movement of the attachment 40 over the inner wall 13 of the infant seat as the infant seat is moved to the collapsed position, as will be more fully described below.

As shown in FIG. 5, when the inner wall 13 is supported in the collapsed nonuse position in contact with rear wall 9, the attachment 40 will be supported in a substantially vertical position adjacent the inner surface of the inner wall 13. When inner wall 13 is angularly displaced forward to open the infant seat, the forward edge of the attachment 40 will be moved upward until horizontally oriented as shown in FIG. 4. When the attachment 40 is supported in the horizontal position, the bottom surface of the forward edge of the attachment 40 will be in abutting engagement with the upper surface of upper transverse portion 14a of the inner wall 13. As shown in FIGS. 4 and 5, the bottom of the attachment 40 is provided with a plurality of downwardly extending integrally formed projections 65 which define a rearwardly open notched area 66. When the infant seat is opened, the bottom surface of the attachment 40 will slide over upper transverse bar 14a until the upper transverse bar 14a is engaged and positioned in notch 66. Projections 65 with notches 66 will restrain the forward edge of the attachment member from being angularly displaced when moved to the horizontal position. After the shopping cart has been used, the inner wall 13 can again be returned to the vertically displaced position causing the upper transverse bar 14a to move rearwardly so that notches 66 will be disengaged thereby allowing the attachment 40 to again drop or be rotated by gravity to the vertically oriented position located adjacent the inner surface of inner wall 13.

As is evident from FIGS. 3 and 6, both the first and second illustrative embodiments of the above described attachment 40 will permit full use of the shopping cart and will permit the shopping cart to be nested with adjacent shopping carts when not in use. In the first illustrative embodiment, the attachment 40 hangs freely when the front of a second cart pushes the rear wall 9 of the cart into the horizontal position. Then, when the rear wall 9' of the second cart is elevated to the horizontal position, the rear wall 9' carries attachment 40 of the first cart up into a horizontal position too. In the second illustrative embodiment, the attachment 40 is carried by the rear wall 9 of the cart to which it is attached to the horizontal position when the rear wall 9 is elevated to the horizontal position upon the nesting of subsequent carts.

It is obvious that the attachment 40 can be constructed of various materials, such as rod wire and that the attachment member could be provided with a number of auxiliary features. One such feature could include a recessed area which would define an ash tray and another feature could be an opening in which beverage bottles could be located or supported during use of the shopping cart.

It now becomes apparent that the above described illustrative embodiment of an attachment for use on a shopping cart is capable of attaining the above stated objects and realizing the above described advantages. It is obvious that those skilled in the art may make modifications in the details of construction without departing from the present invention which is to be limited only by the scope of the appended claims.

What is claimed is:

1. In a shopping cart of the type including an open top basket with a rear wall pivotally supported at its upper portion about a horizontal axis so that its lower portion is swingable inwardly into the basket and an inner wall pivotally supported at its lower end to said rear wall with its upper portion swingable toward and away from the upper portion of said rear wall between positions adjacent said rear wall and spaced away from said rear wall, the combination therewith of an attachment connected at one of its end portions to the upper portion of one of said walls and of a length sufficient to extend over the upper portion of the other of said walls when said inner wall is spaced away from said rear wall, said attachment being pivotable with respect to the wall to which it is connected so that it rests upon and is supported by the upper position of the other of said walls when said inner wall is spaced away from said rear wall and is slidable over the upper portion of the other of said walls as said inner wall is moved toward or away from said rear wall and hangs in a downward attitude from the wall to which it is attached when said inner wall is adjacent said rear wall.

2. The combination of claim 1 wherein said attachment is connected at one of its end portions to the upper portion of said rear wall and said attachment is of a length sufficient to extend over the upper portion of said inner wall when said inner wall is spaced away from said rear wall, said attachment being pivotable with respect to the rear wall so that it rests upon and is supported by the upper portion of said inner wall when said inner wall is spaced away from said rear wall and is slidable over the upper portion of said inner wall as said inner wall is moved toward or away from said rear wall and hangs in a downward attitude from said rear wall when said inner wall is adjacent said rear wall.

3. The combination of claim 1 and wherein said attachment comprises a platform with a substantially flat surface facing upwardly when said inner wall is spaced away from said rear wall and said attachment rests upon the upper portion of one of said walls.

4. The combination of claim 1 and wherein said attachment comprises a platform with a substantially flat surface facing upwardly when said inner wall is spaced away from said rear wall and said attachment rests upon the upper portion of said inner wall.

* * * * *